(No Model.) 2 Sheets—Sheet 1.

R. M. HUNTER.
ELECTRIC MEASURING INSTRUMENT.

No. 496,312. Patented Apr. 25, 1893.

Attest  
Inventor (No Model.) 2 Sheets—Sheet 2.
R. M. HUNTER.
ELECTRIC MEASURING INSTRUMENT.

No. 496,312. Patented Apr. 25, 1893.

Attest  Inventor

UNITED STATES PATENT OFFICE.

RUDOLPH M. HUNTER, OF PHILADELPHIA, PENNSYLVANIA, ASSIGNOR TO THE THOMSON-HOUSTON ELECTRIC COMPANY, OF CONNECTICUT.

ELECTRIC MEASURING-INSTRUMENT.

SPECIFICATION forming part of Letters Patent No. 496,312, dated April 25, 1893.

Application filed November 16, 1892. Serial No. 452,123. (No model.)

*To all whom it may concern:*

Be it known that I, RUDOLPH M. HUNTER, of the city and county of Philadelphia and State of Pennsylvania, have invented an Improvement in Electric Measuring-Instruments, of which the following is a specification.

My invention has reference to electric measuring instruments, and consists of certain improvements which are fully set forth in the following specification and shown in the accompanying drawings which form a part thereof.

This application, Case No. 234, has particular reference to instruments for measuring volts and ampères.

In carrying out my invention I provide an expansion wire through which the current or a portion thereof is caused to pass, the varying length of which under the action of electric current, operates a pointer or indicator, preferably causing it to traverse over a scale. In connection with such devices, I employ a movable support for one end of the expansion wire which is operated by a spring to keep the expansion wire under tension, and a second or tension wire to hold the movable support against the action of the spring to limit its possible action and prevent any movement except for variations in atmospheric temperature. The object of this second or tension wire is to permit the spring to cause the movable support of the expansion wire to adjust itself to compensate for the varying length of the expansion wire under the varying temperature of the atmosphere due to atmospheric changes or difference in location of the measuring instrument. In operation, the current passes through the expansion wire independent of the second wire so that when the meter is operated to measure current the indicator or needle alone is influenced by the expansion. While variation in the length of the expansion wire takes place from atmospheric changes of temperature, the second or tension wire also has its length correspondingly varied and thereby modifies the position of the support for the expansion wire, and prevents any action upon the pointer due to the change in the length of the expansion wire for atmospheric changes. The instrument is, therefore, perfectly compensating in its operation.

Figure 1:
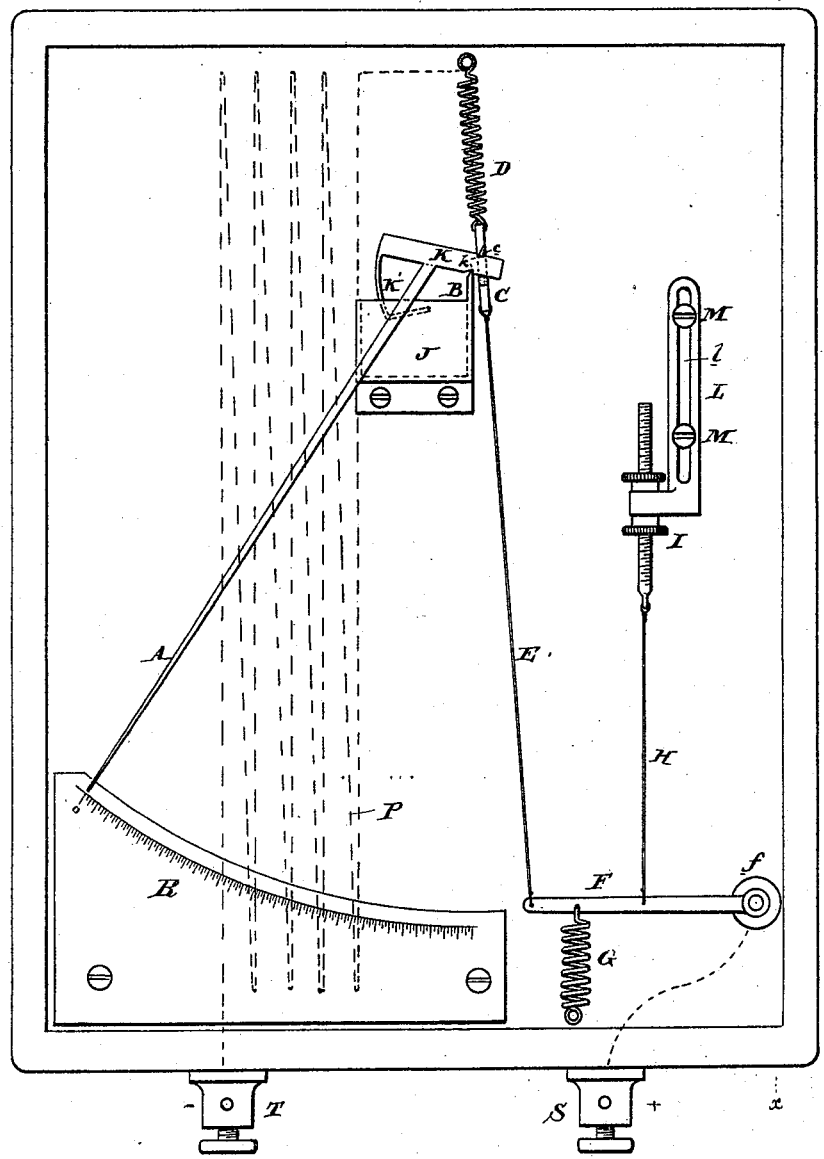
Figure 2:
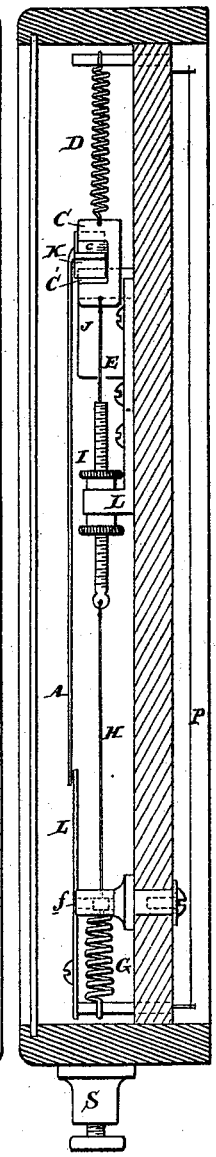
Figure 3:
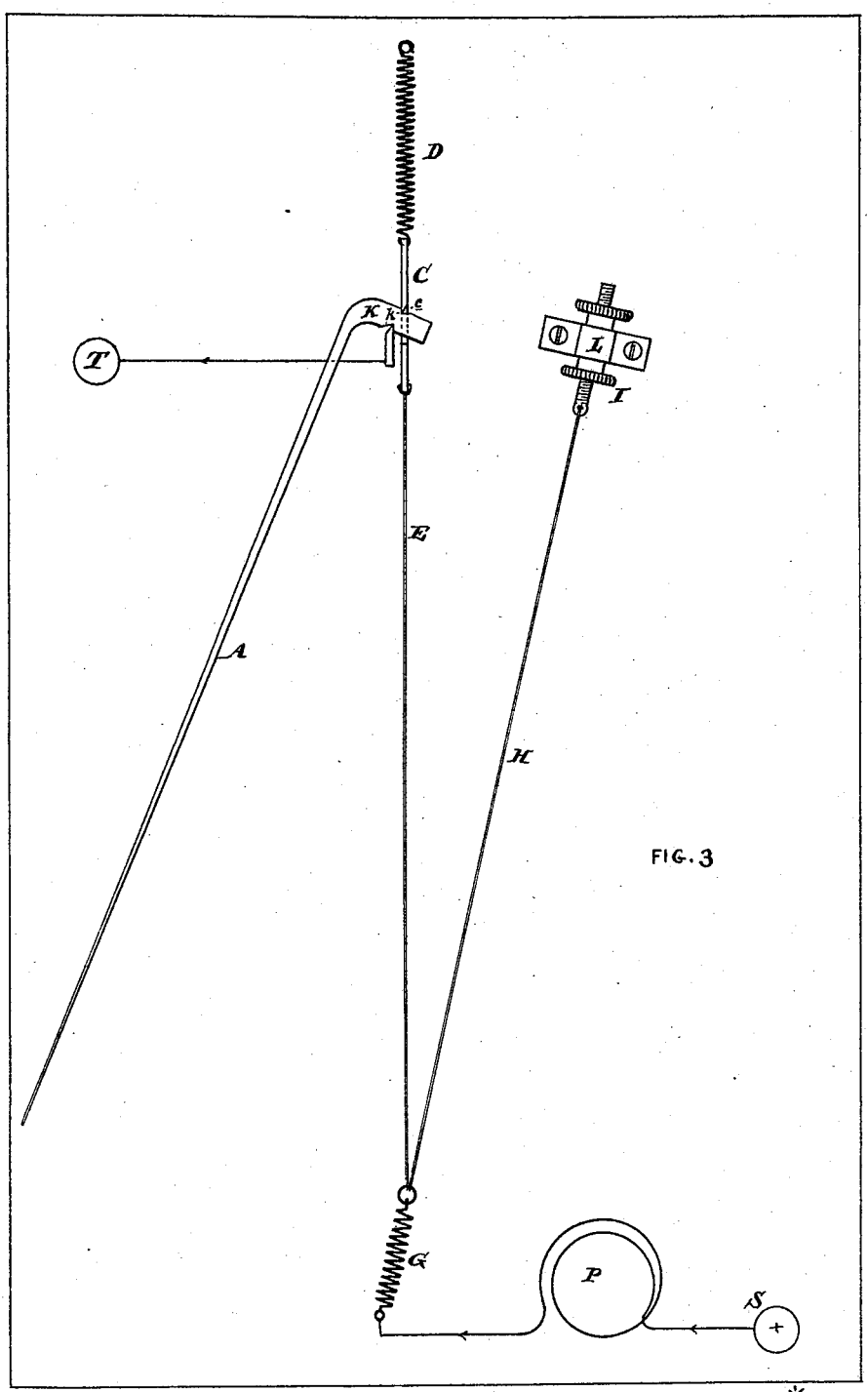

In the drawings, Figure 1 is a front elevation of a measuring instrument embodying my invention. Fig. 2 is a sectional elevation of same on line $x—x$; and Fig. 3 is an elevation of a modification of my invention.

A is a pointer formed of suitable material, and is secured at its upper end to a block K having notches $k$ upon the opposite sides. The under notch receives the stationary fulcrum B so that the pointer swings about it as a center while traversing a scale or dial R.

C is a plate having the notch C' formed with a downwardly projecting knife edge $c$ which rests in the upper notch $k$ of the block K. The upper end of the plate C is connected by a spring D with the frame of the instrument. The lower part of the plate C is connected to the upper end of the expansion wire E of any suitable material such as German silver. The lower end of the expansion wire E is connected to a pivoted or movable support F fulcrumed at $f$ to the frame of the instrument. The movable support F is drawn down by a spring G so as to oppose the action of the spring D and keep the wire E under tension. The tension wire H is connected to the pivoted support F preferably midway between the wire E and the pivot $f$ and is connected at its other end to the adjustable screw device I consisting of a screw and nuts for adjusting the wire H relatively to a fixed support L. The wire H limits the action of the spring G in a downward direction and only permits the spring G to act to move the support F when the wire H expands for variations in the temperature due to atmospheric changes. The wire H should be half the length of the wire E in the construction shown in Fig. 1, though this would vary according to the particular connection of the wire H with the pivoted support F. In Fig. 3 the wire H should equal wire E in length. The support L is provided with a slot $l$ and two clamping screws M whereby the support L may be adjusted vertically if desired. In practice, however, this would hardly be necessary, as the wire H may be made exactly of a given length relatively to the wire E. It is evident that the movable support F might be made of any suitable construction, and in fact might be simply the upper end of the spring G when the lower ends of both wires E and H are connected to said spring as indicated in Fig. 3.

The block K may be provided with a paddle K' working in a glycerine receptacle J to prevent too sudden a movement on the pointer A, thus making the instrument "dead beat" in its action.

S is the positive binding post or terminal and connects with the movable support F.

T is the negative binding post or terminal and is electrically connected to the upper end of the wire E either by connection through the fulcrum B or by connection with the terminal of the spring D, preferably the latter. A resistance P of any suitable construction is preferably arranged in the back of the case of the instrument and in series or parallel with wire E according as to whether it is to measure volts or ampères.

It is quite evident that if the support F is not employed as in the case of the construction of Fig. 3 the spring G may be formed of metal of fairly large cross section so as to permit all of the current necessary to traverse the wire E without destroying the tension of the spring.

I do not limit myself to any particular details of construction as they may be modified in various ways without departing from the essential features of the invention.

What I desire to secure by Letters Patent is—

1. In a measuring instrument for electric currents, the combination of a pivoted pointer, an expansion wire adapted to operate the pointer, a spring acting to hold the end of the expansion wire most distant from the pointer against movement, a tension wire adapted to hold the spring against movement except under the action of atmospheric changes of temperature, and electrical circuits for supplying current to the expansion wire without traversing the tension wire.

2. In a measuring instrument for electric currents, the combination of a pivoted pointer, an expansion wire adapted to operate the pointer, a spring acting to hold the end of the expansion wire most distant from the pointer against movement, a tension wire adapted to hold the spring against movement except under the action of atmospheric changes of temperature, electric circuits for supplying current to the expansion wire without traversing the tension wire, and means to adjust the tension wire.

3. In a measuring instrument for electric currents, the combination of a pivoted pointer, an expansion wire adapted to operate the pointer, a spring independent of the pointer or its support acting to hold one end of the expansion wire against movement, a tension wire adapted to hold the spring against movement except under the action of atmospheric changes of temperature, electric circuits for supplying current to the expansion wire without traversing the tension wire, and means forming part of the pointer to make the latter dead beat in its action.

4. In a measuring instrument for electric currents, the combination of a pivoted pointer, an expansion wire connecting with the pointer to operate it, springs operating upon each end of the expansion wire to keep it under tension, a tension wire operating to prevent the spring at the end of the expansion wire most distant from the pointer from having any action except under the influence of atmospheric changes of temperature, and terminals connecting with expansion wire, whereby the electric current is caused to traverse the expansion wire but not the tension wire.

5. In a measuring instrument for electric currents, the combination of a pivoted pointer, an expansion wire connecting with the pointer to operate it, springs operating upon each end of the expansion wire to keep it under tension, a tension wire operating to prevent the spring at the end of the expansion wire most distant from the pointer from having any action except under the influence of atmospheric changes of temperature, terminals connecting with expansion wire whereby the electric current is caused to traverse the expansion wire but not the tension wire, a dial plate over which the pointer traverses, a vessel containing glycerine or other suitable fluid, and a dasher or paddle carried by the pointer.

6. In a measuring instrument for electric currents, the combination of a pivoted pointer, an expansion wire connecting with the pointer to operate it, springs operating upon each end of the expansion wire to keep it under tension, a tension wire operating to prevent the spring at the end of the expansion wire most distant from the pointer from having any action except under the influence of atmospheric changes of temperature, terminals connecting with expansion wires whereby the electric current is caused to traverse the expansion wire but not the tension wire, and means to adjust the tension wire.

7. In a measuring instrument for electric currents, the combination of a pivoted pointer working upon a fulcrum B, a plate C having the knife edge c for operating the pointer, a spring D for raising the plate C, an expansion wire E connected with the plate C, a movable support F pivoted at f and having its free end connected with the expansion wire E, a spring G operating upon the movable support to keep the wire E under tension, a tension wire H connected with the movable support to limit the action of the spring G, and electric circuits for causing the current to traverse the expansion wire E.

8. In a measuring instrument for electric currents, the combination of a pivoted pointer working upon a fulcrum B, a plate C having the knife edge c for operating the pointer, a spring D for raising the plate C, an expansion wire E connected with the plate C, a movable support F pivoted at f and having its free end connected with the expansion wire E, a spring G operating upon the movable support to keep the wire E under tension, a tension wire H connected with the movable support to limit the action of the spring G electric circuits for causing the current to traverse the expansion wire E, and means to adjust the tension wire H.

9. In a measuring instrument for electric currents, the combination of a movable part or pointer, an expansion conductor maintained in a stretched condition and adapted to operate the movable part or pointer, a spring mechanically independent of the pointer or its support to bodily move the expansion conductor, a tension wire expansible under the varying atmospheric changes of the temperature adapted to hold the spring against movement except under the action of said atmospheric changes of temperature, and electric circuits for supplying current to the expansion wire without traversing the tension wire.

10. In a measuring instrument for electric currents, the combination of a movable part or pointer, two expansible metallic bodies adapted to change their length under varying temperatures, a movable support connected with one end of each of the expansible bodies adapted to keep them under tension, a connection between one of the expansible bodies and the movable part or pointer, a pivot or support for the movable part or pointer independent of the movable support, and conductors connecting with one of the expansible bodies to cause an electric current to traverse it to produce an increased expansion of said expansible conductor.

11. In a measuring instrument for electric currents, the combination of a movable part or pointer, a long expansible body maintained under tension in connection with the movable part or pointer and movable as an entirety, a second long expansible body also maintained under tension immovably connected at one end and mechanically connected at the other end with the first mentioned expansible body at a place distant from the movable part or pointer, and electric circuits for causing an electric current to traverse one only of the expansible bodies.

In testimony of which invention I have hereunto set my hand.

R. M. HUNTER.

Witnesses:
ERNEST HOWARD HUNTER,
H. L. MOTHERWELL.